(12) United States Patent
Dandurand et al.

(10) Patent No.: US 8,833,873 B2
(45) Date of Patent: *Sep. 16, 2014

(54) DRIVE TRACK FOR SNOWMOBILE OR TRACKED VEHICLE

(75) Inventors: Jules Dandurand, Sherbrooke (CA); Denis Courtemanche, Richmond (CA)

(73) Assignee: Camoplast Solideal Inc., Sherbrooke, Quebec (CA)

( * ) Notice: Subject to any disclaimer, the term of this patent is extended or adjusted under 35 U.S.C. 154(b) by 406 days.

This patent is subject to a terminal disclaimer.

(21) Appl. No.: 13/307,816

(22) Filed: Nov. 30, 2011

(65) Prior Publication Data

US 2012/0074772 A1    Mar. 29, 2012

Related U.S. Application Data

(63) Continuation of application No. 11/797,267, filed on May 2, 2007, now Pat. No. 8,083,296, and a continuation-in-part of application No. 11/434,057, filed on May 16, 2006, now Pat. No. 7,823,987.

(30) Foreign Application Priority Data

Jun. 2, 2005   (CA) ..................................... 2509059

(51) Int. Cl.
*B62D 55/24*   (2006.01)
*B62D 55/26*   (2006.01)

(52) U.S. Cl.
CPC .............. *B62D 55/244* (2013.01); *B62D 55/26* (2013.01)
USPC ............................ 305/166; 305/170; 305/171

(58) Field of Classification Search
CPC ........ B62D 55/00; B62D 55/08; B62D 55/24; B62D 55/244
USPC .......... 305/157–158, 165–184; 474/260–262, 474/266–267
See application file for complete search history.

(56) References Cited

U.S. PATENT DOCUMENTS

| | | | |
|---|---|---|---|
| 1,924,354 A | 8/1933 | Freedlander | |
| 2,793,150 A | 5/1957 | Deaves | |
| 3,480,339 A | 11/1969 | Kell | |
| 3,485,707 A | 12/1969 | Spicer | |
| 3,704,918 A | 12/1972 | Perreault | |
| 3,712,689 A | 1/1973 | Chaumont | |
| 3,721,477 A | 3/1973 | Cooper et al. | |
| 3,858,948 A | 1/1975 | Johnson et al. | |
| 5,145,242 A | 9/1992 | Togashi | |
| 5,380,076 A | 1/1995 | Hori | |
| 5,593,218 A | 1/1997 | Katoh et al. | |
| 5,730,510 A | 3/1998 | Courtemanche | |
| 6,007,912 A | 12/1999 | Doujak | |
| 6,109,705 A | 8/2000 | Courtemanche | |
| 6,203,125 B1 | 3/2001 | Arakawa et al. | |
| 6,406,655 B1 | 6/2002 | Courtemanche | |
| 6,811,877 B2 | 11/2004 | Haislet et al. | |
| 7,304,006 B2 | 12/2007 | Lee et al. | |
| 7,823,987 B2 | 11/2010 | Dandurand et al. | |
| 8,083,296 B2 * | 12/2011 | Dandurand et al. | 305/166 |
| 2001/0009336 A1 | 7/2001 | Hori | |
| 2002/0067074 A1 | 6/2002 | Katayama et al. | |
| 2002/0175563 A1 | 11/2002 | Katayama | |
| 2006/0105874 A1 | 5/2006 | Shimamura | |

\* cited by examiner

*Primary Examiner* — Jason Bellinger

(57) ABSTRACT

A track formed of a molded rubber base sandwiching a cord layer and a single layer of ply fabric extending longitudinally of the track.

26 Claims, 10 Drawing Sheets

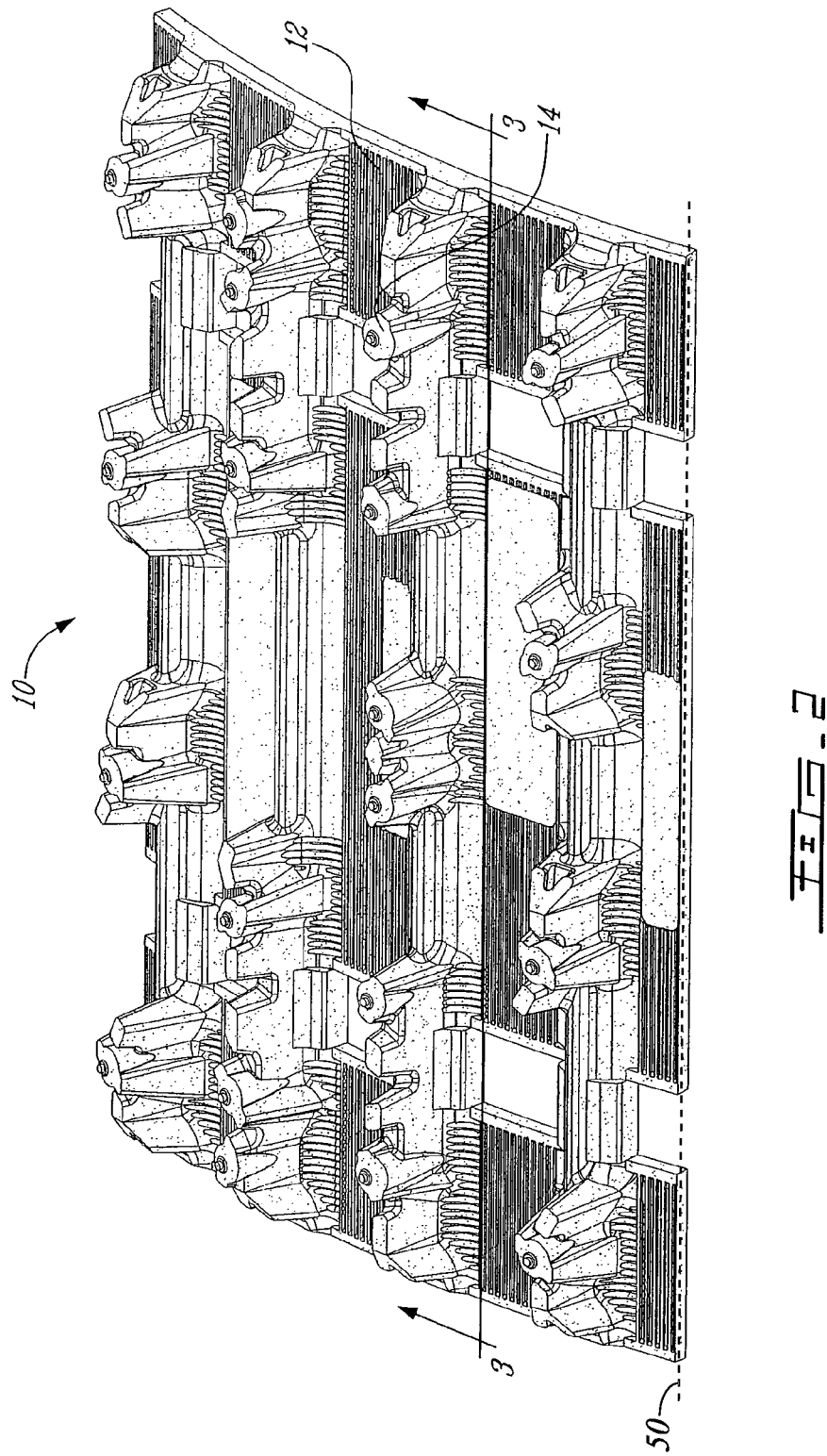

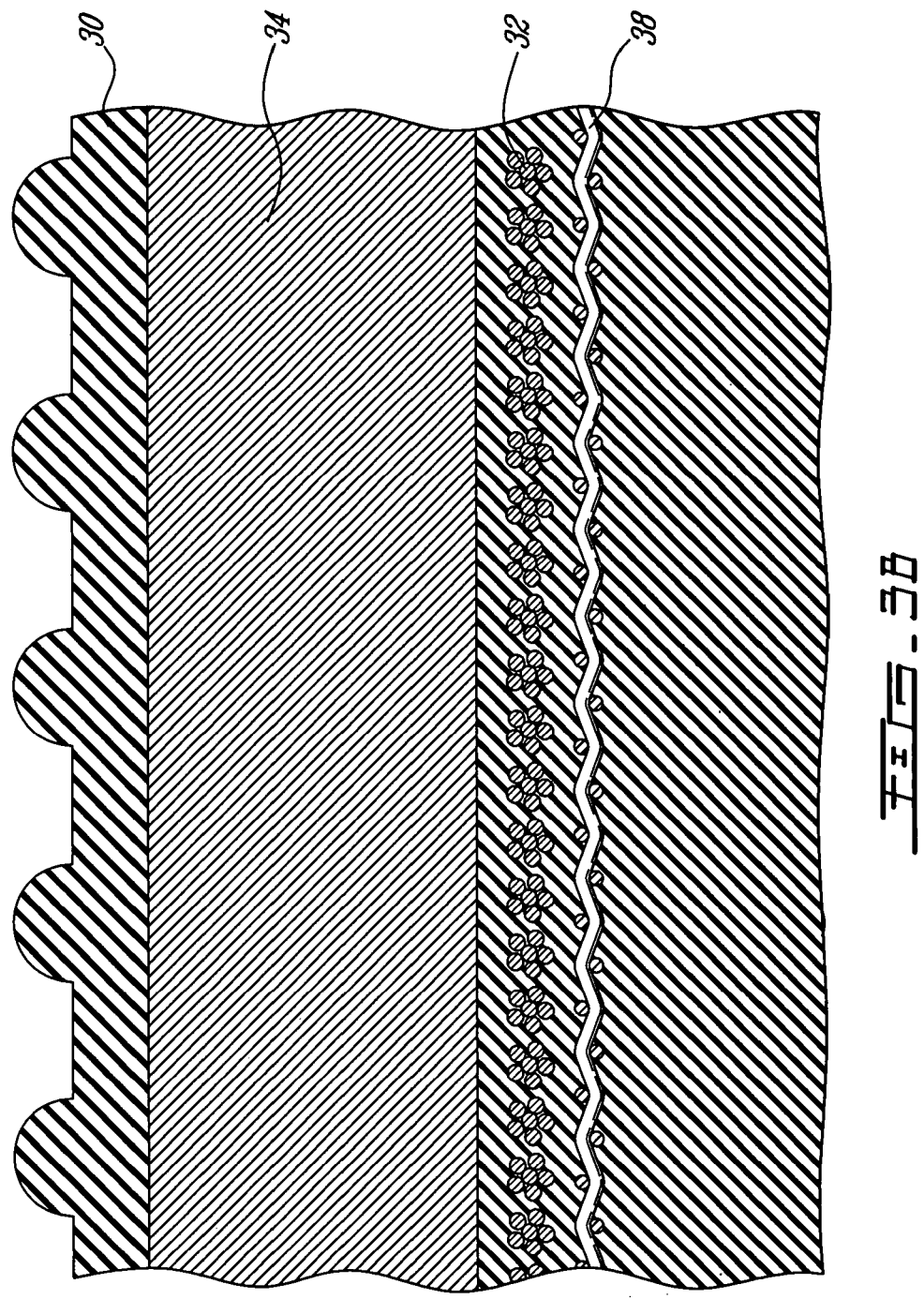

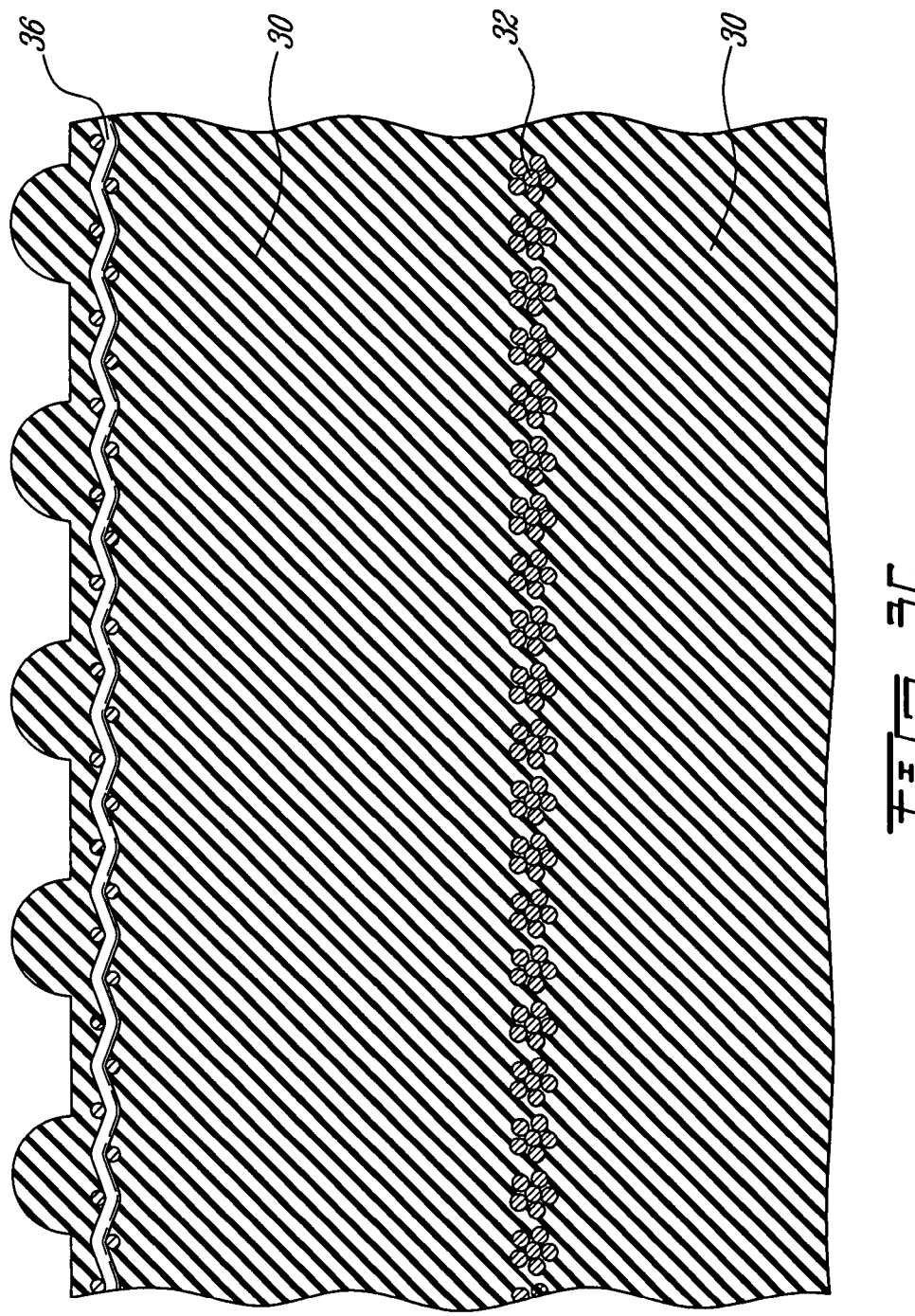

_US 8,833,873 B2_

DRIVE TRACK FOR SNOWMOBILE OR TRACKED VEHICLE

CROSS REFERENCE TO RELATED APPLICATIONS

This application is a continuation application of U.S. patent application Ser. No. 11/797,267 filed on May 2, 2007, now U.S. Pat. No. 8,083,296, which is a continuation-in-part application of U.S. patent application Ser. No. 11/434,057 filed on May 16, 2006, now U.S. Pat. No. 7,823,987, which itself claims priority on Canadian application no. 2,509,059, filed on Jun. 2, 2005. All documents above are herein incorporated by reference.

FIELD OF THE INVENTION

The present invention pertains to a drive track and, more particularly, to a track for snowmobiles or other tracked vehicles, having an improved construction to decrease horse power, increase top speed and improve durability of the track when the latter is driven at high rotational speeds.

BACKGROUND OF THE INVENTION

Endless drive tracks for propelling, for example, a snowmobile over snow, ice or other similar ground structure, are known in the art. The mounting of this track to a snowmobile and the mounting of such track on an all-terrain vehicle are well known. The track has a ground engaging outer side and an inner side that receives and supports, on the lower run thereof, a suspension which may consist of a wheel assembly or a slide rail assembly, both of which are also well known in the art.

Conventionally, the track rotates by means of a motor driven sprocket unit at the forward end of the vehicle and idle drive wheels are mounted at the aft end of the vehicle to support the rear end of the track. Sprockets engage a series of lugs integrally formed with the inner surface of the track.

With reference to FIG. 1, the endless body is generally formed of a molded rubber base having, embedded therein, a first layer of reinforcing fabric 38 extending longitudinally of the track, a series of laterally spaced cord strands 40 which extend between the first layer of fabric and beneath a rod 34, and a second ply 36 fabric disposed above the rod 34. Such arrangement has been shown to allow good track performance and longevity. It is generally believed that an increased amount of fabric contributes these performances. In areas of the track where there is no rod, it is about at mid-thickness of the track where the fiber of the rubber is the strongest, this line of zero stress in cross section of the track separating the region of compressive stress from that of tensile stress being known as the neutral fiber.

In spite of efforts in this field, there is still a need for a lighter, cost effective track.

SUMMARY OF THE INVENTION

More specifically, there is provided a track for a tracked vehicle, comprising a molded rubber base sandwiching a cord layer and a single layer of ply fabric extending at least in parts longitudinally in the rubber base.

Other objects, advantages and features of the present invention will become more apparent upon reading of the following non-restrictive description of embodiments thereof, given by way of example only with reference to the accompanying drawings.

BRIEF DESCRIPTION OF THE DRAWINGS

In the appended drawings:

FIG. 2 is a perspective view of a portion of a track according to an embodiment of the present invention;
FIGS. 3A-3F are cross-sectional views of track according to different embodiments of the present invention.

DESCRIPTION OF EMBODIMENTS OF THE INVENTION

As shown in FIG. 2, a track 10 according to an embodiment of the present invention comprises a ground engaging outer side 12 and an inner side (not seen in FIG. 2).

Figure 1:
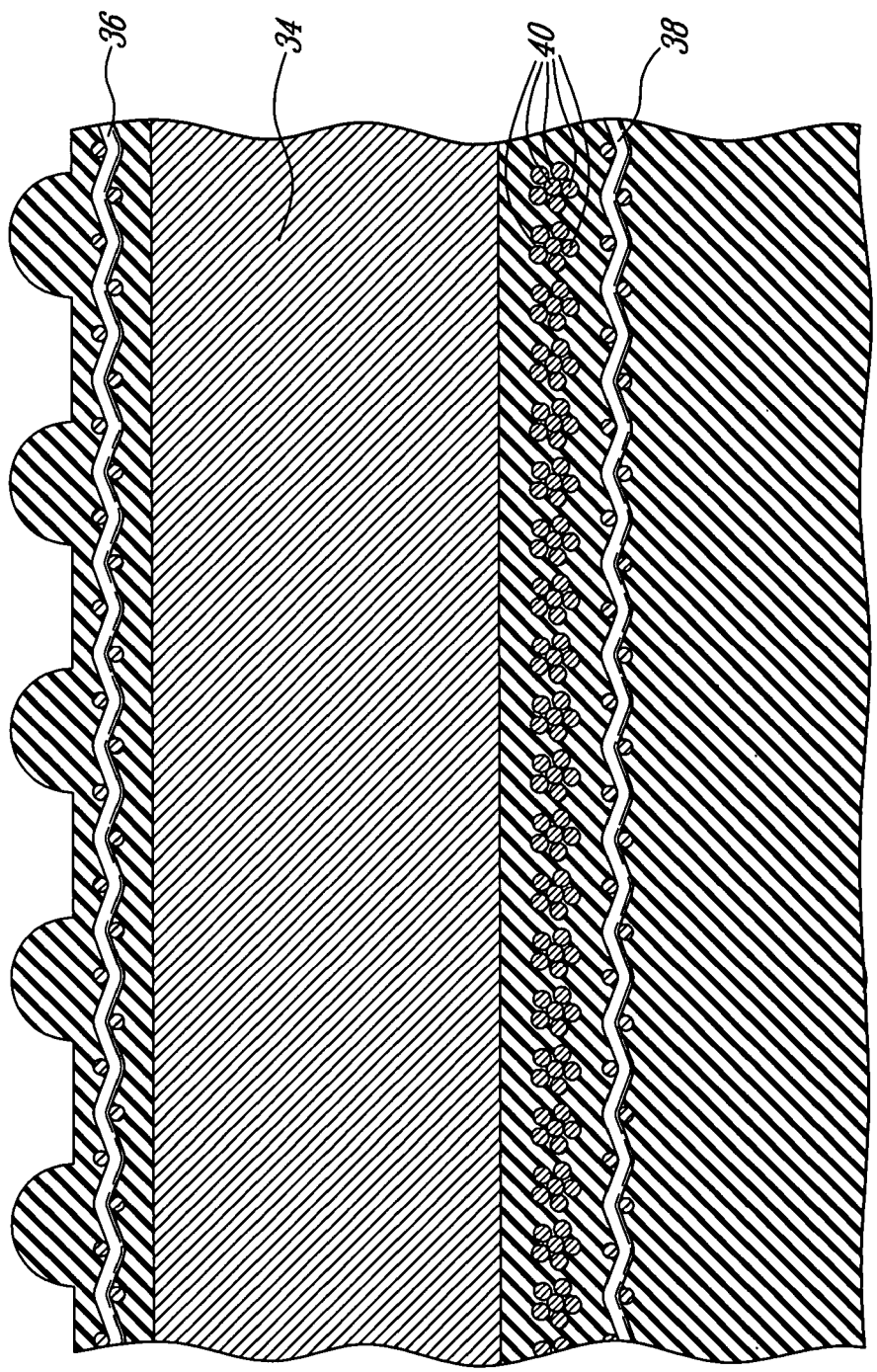
FIG. 1 is a cross section of a track as known in the art.
Figure 3A:
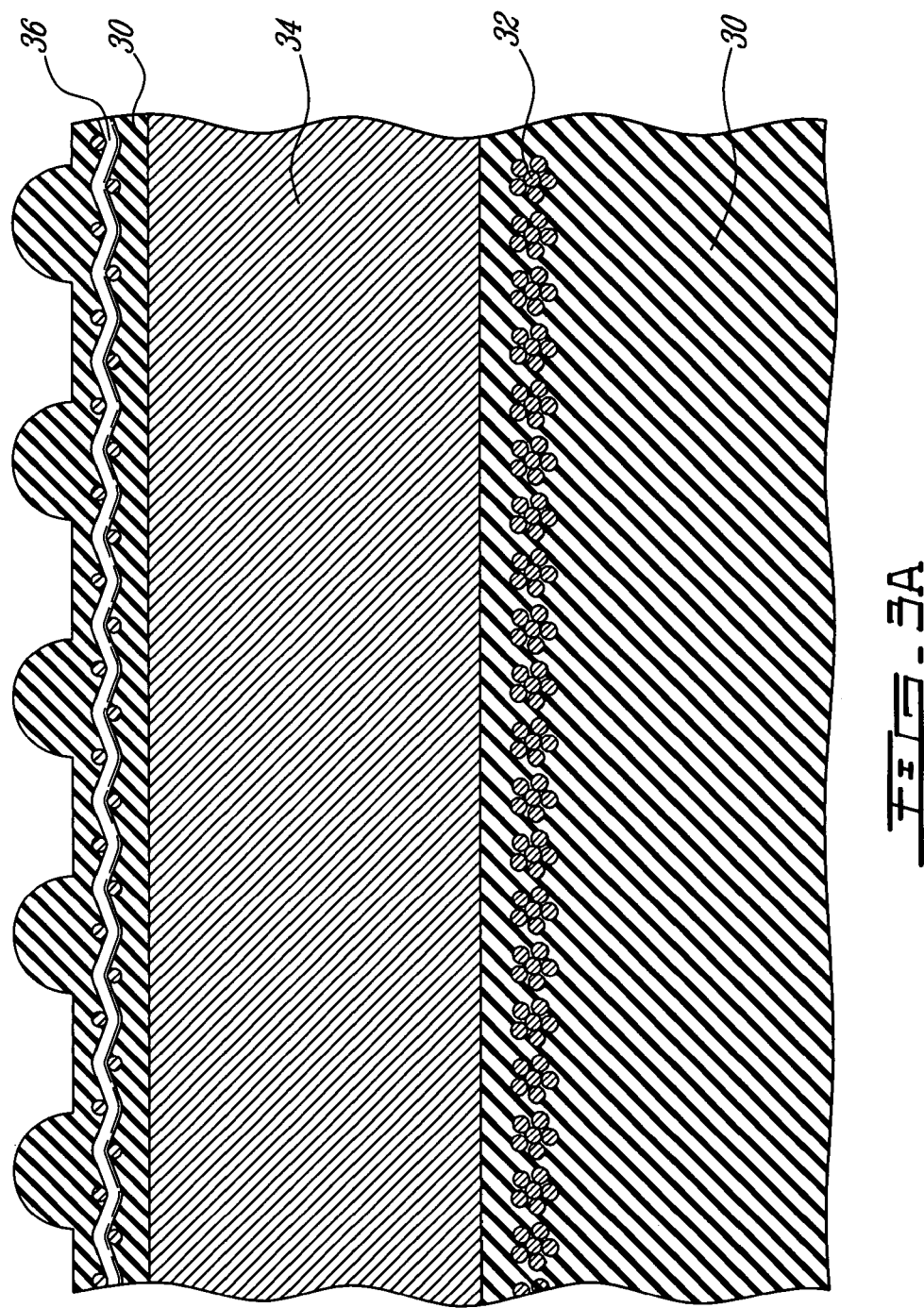
Figure 30:
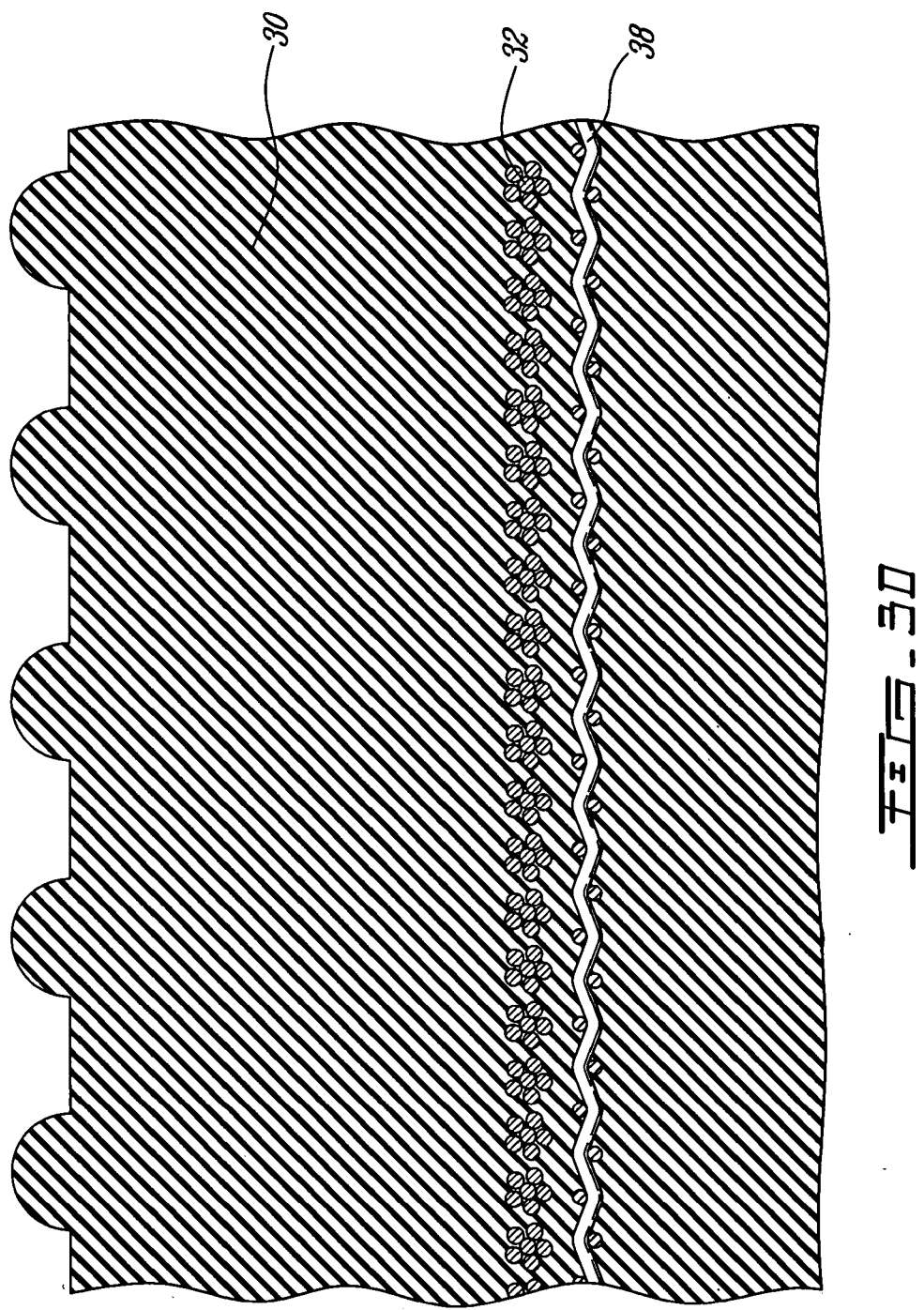

As seen in the cross-section of FIG. 3A, the track 10 is formed of a molded rubber base 30 sandwiching a cord layer 32, a cross bar 34 and a top layer of ply fabric 36 extending longitudinally.

The cross bar 34 may consists of a rod as known in the art, made of composite material for example. It is located at spaced intervals along the longitudinal direction of the track beneath the profiles 14 projecting from the outer side 12 of the track.

The cord layer 32 comprises a dense strand arrangement formed of a twist arrangement of strands, comprising for example at least 18 strands per inch for a cord of 1.25 mm. The strands include high strength, light weight materials such as man made fibers, such as Kevlar™, nylon, and polyester fabric for example.

In FIG. 3A, the cord layer 32 extends in the rubber base 30 and passes beneath the rod 34.

The cord layer 32 may be discontinued at locations of the track where the idler wheels pass.

The top ply of fabric 36 includes woven man-made fibers such as nylon for example.

In FIG. 3B, the track is formed of a molded rubber base 30 sandwiching a single layer of ply fabric 38, a cord layer 32 and a cross bar 34. In this embodiment, the bottom ply of fabric 38 lies beneath the cord layer 32, and the region above the cross bar 34 comprises the molded rubber base 30 only.

FIGS. 3C and 3D show a track devoid of cross bar, in which the molded rubber base 30 sandwiches a top layer of ply fabric 36 and a cord layer 32, and the molded rubber base 30 sandwiches a bottom layer of ply fabric 38 and a cord layer 32, respectively.

Figure 3E:
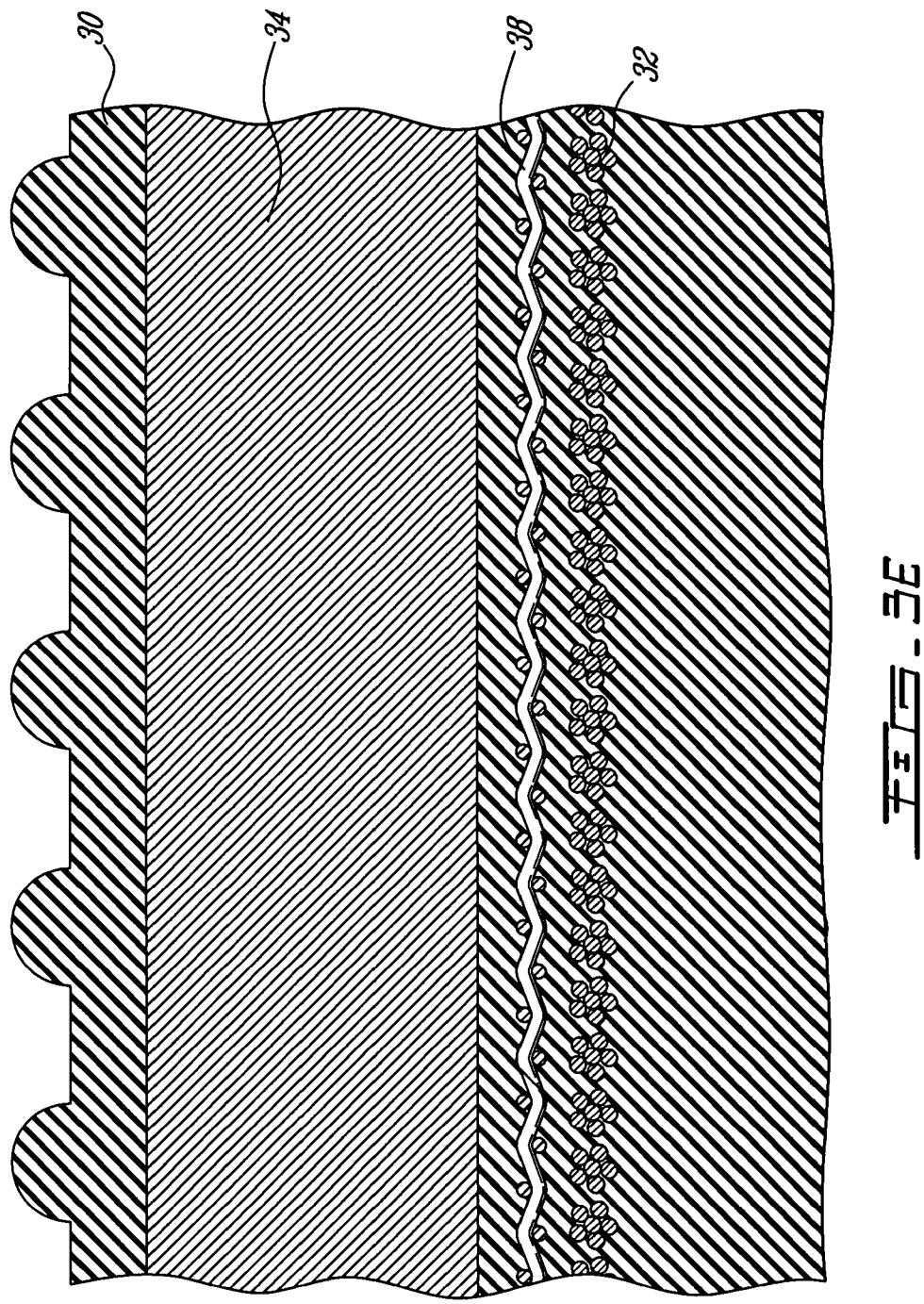

In FIG. 3E, as in FIG. 3B, the track is formed of a molded rubber base 30 sandwiching a cord layer 32, a single layer of ply fabric 38, a cross bar 34, the region above the cross bar 34 comprising the molded rubber base 30 only. In this embodiment, the single layer of ply fabric 38 lies between the cord layer 32 and the cross bar 34.

Figure 3F:
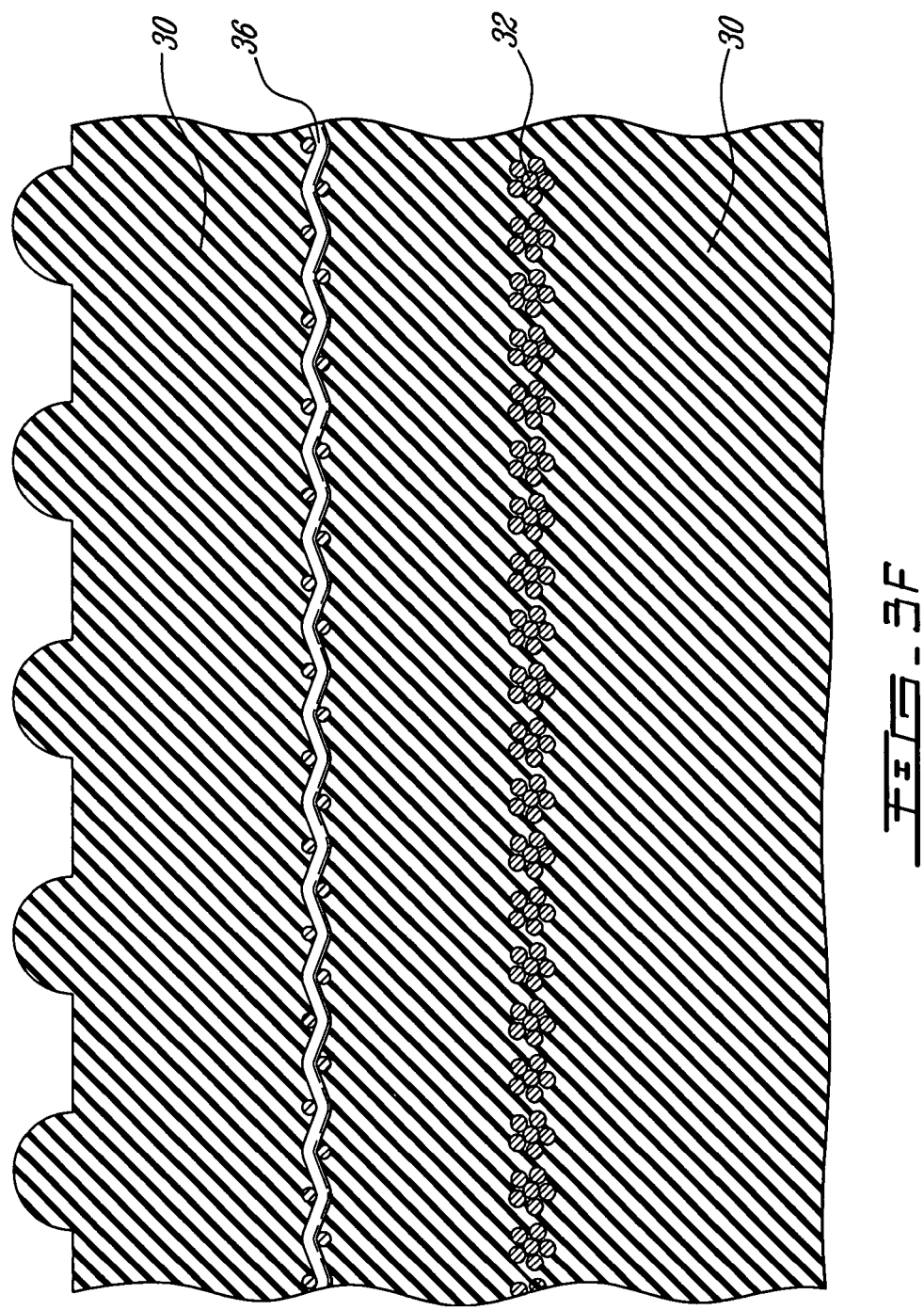

In FIG. 3F, instead of being located near the surface of the rubber base 30 as in FIG. 3C, the single layer of ply fabric 36 is located towards the interior of the rubber base 30.

Figure 4:
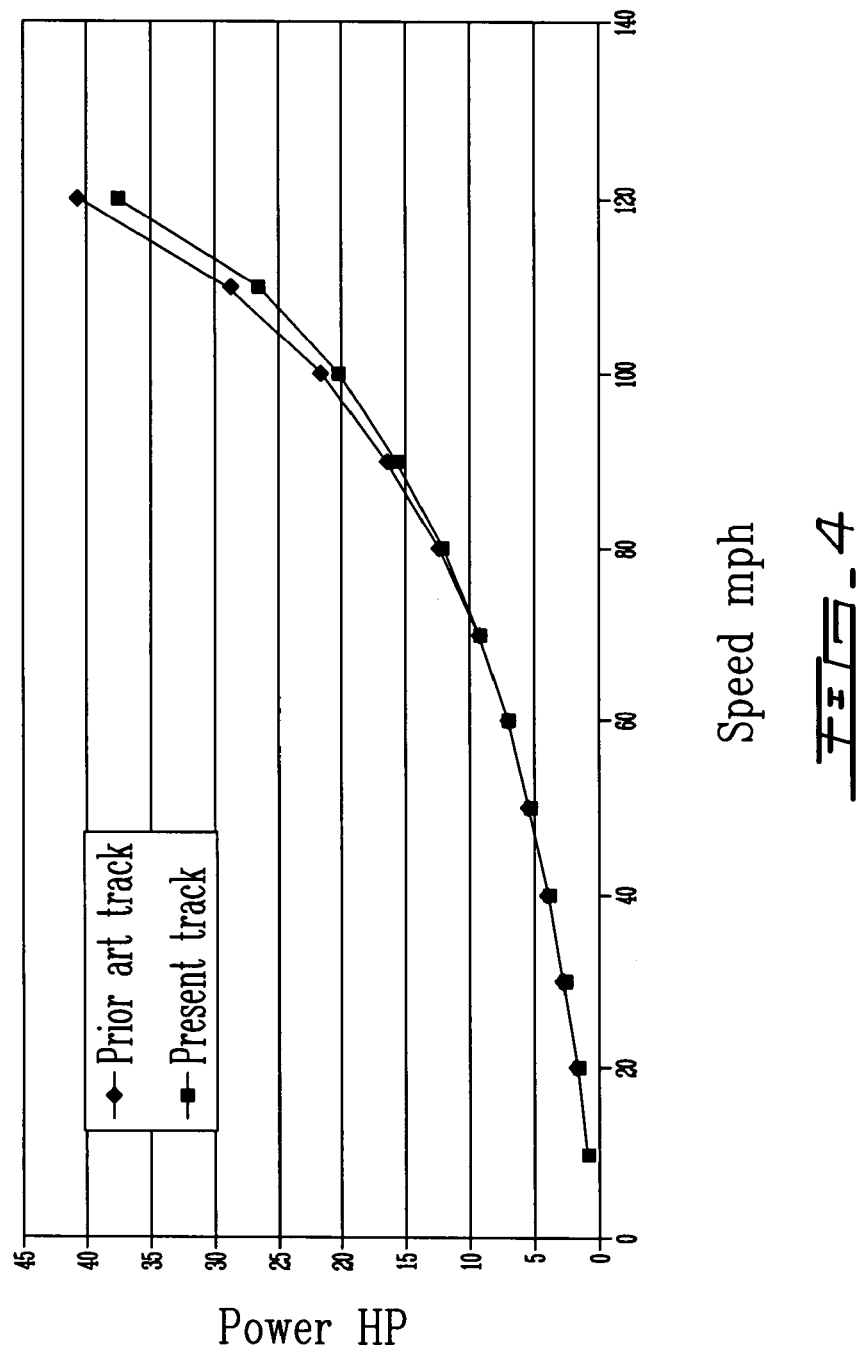
FIG. 4 is a graph of power as a function of speed, used by a track according to the present invention, in a test without traction.
Figure 5:
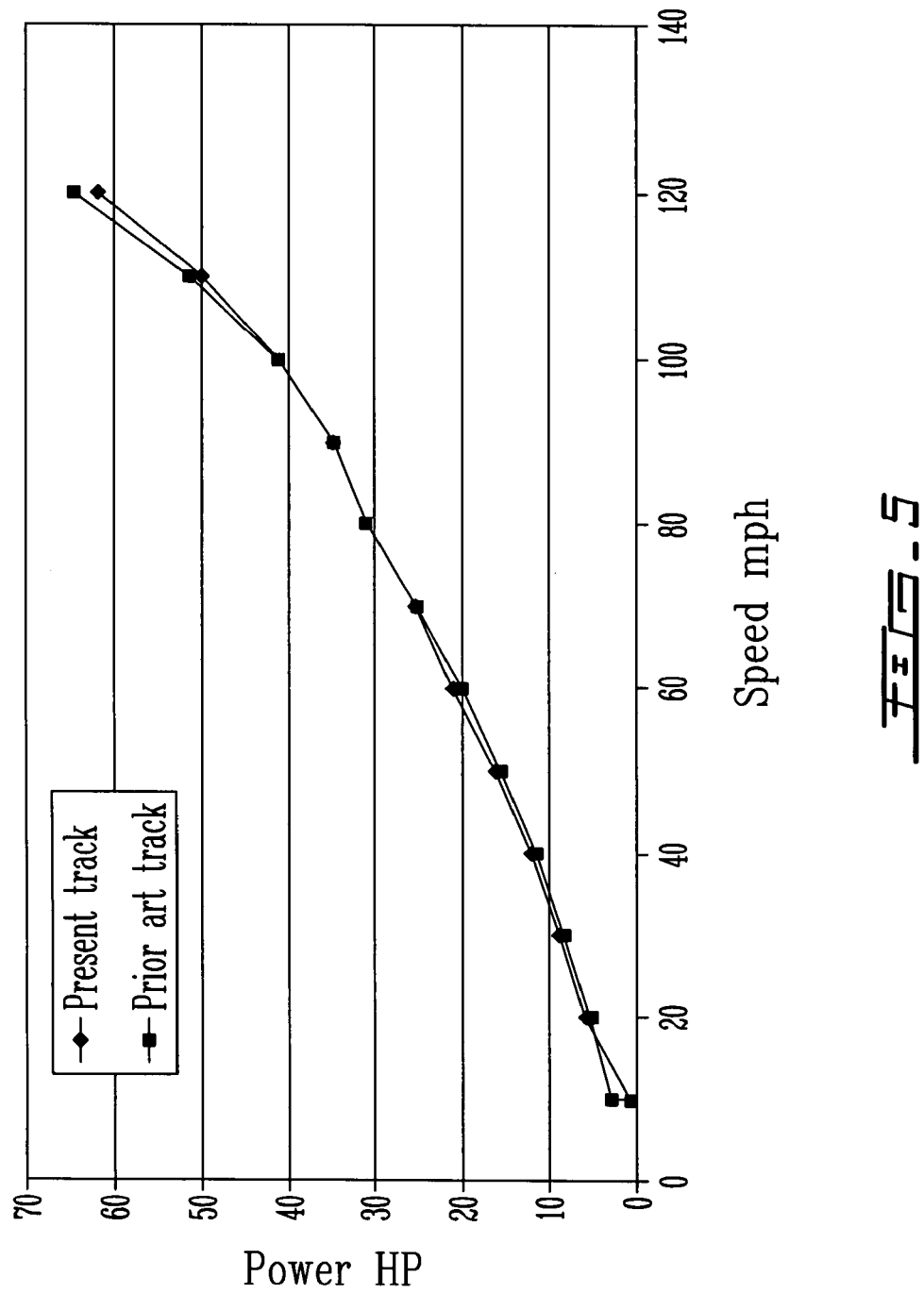
FIG. 5 is a graph of power as a function of speed, used by a track according to the present invention, in a test including traction.

As shown in FIGS. 4 and 5, the present track is found to necessitate equal or less power, which goes against the current belief in the industry that the greater the amount of fabric in the track composition, the better the performances.

People in the art will appreciate that the present invention provides, in contrast to a track standardly made in the art and including an arrangement of rubber, a first ply fabric, cord, rod, second ply fabric and rubber, a track comprising a single layer of ply fabric, yielding a track of reduced thickness, weight and cost, while maintaining target performances thereof in terms of power and longevity. In particular, the present composition is shown to decrease horse power, increase top speed and improve durability of the track when the latter is driven at high rotational speeds. It has also been found to optimize the so-called neutral fiber 50 bringing it closer to the outer side of the track.

The present track may be used for a range of tracked vehicles.

Although the present invention has been described hereinabove by way of embodiments thereof, it may be modified, without departing from the nature and teachings of the subject invention as defined in the appended claims.

What is claimed is:

1. An endless track for traction of a snowmobile or all-terrain vehicle (ATV), the endless track comprising:
   a) a rubber-based body having:
      an inner side for facing a drive wheel of the snowmobile or ATV; and
      a ground-engaging outer side for engaging the ground on which the snowmobile or ATV travels;
   b) a plurality of rubber-based traction projections projecting outwardly from the ground-engaging outer side; and
   c) a layer of reinforcing fabric embedded within the rubber-based body;
   wherein the endless track is free of reinforcing fabric extending along the endless track between the inner side and the layer of reinforcing fabric and free of reinforcing fabric extending along the endless track between the ground-engaging outer side and the layer of reinforcing fabric.

2. The endless track claimed in claim 1, wherein the layer of reinforcing fabric is closer to the ground-engaging outer side than to the inner side in a thickness direction of the endless track.

3. The endless track claimed in claim 1, wherein the layer of reinforcing fabric is located within the rubber-based body such that a neutral area separating a region of compressive stress of the endless track and a region of tensile stress of the endless track is closer to the ground-engaging outer side than to the inner side in a thickness direction of the endless track.

4. The endless track claimed in claim 1, comprising a layer of cords embedded within the rubber-based body, the cords extending generally parallel to one another and in a longitudinal direction of the endless track.

5. The endless track claimed in claim 4, wherein the layer of reinforcing fabric is located between the ground-engaging outer side and the layer of cords.

6. The endless track claimed in claim 4, wherein the layer of reinforcing fabric is located between the inner side and the layer of cords.

7. The endless track claimed in claim 4, wherein the layer of reinforcing fabric is spaced apart from the layer of cords in a thickness direction of the endless track.

8. The endless track claimed in claim 7, wherein a spacing of the layer of reinforcing fabric and the layer of cords in the thickness direction of the endless track is greater than a thickness of the layer of reinforcing fabric.

9. The endless track claimed in claim 4, wherein each of the cords comprises a plurality of strands.

10. The endless track claimed in claim 1, comprising a plurality of cross bars embedded within the rubber-based body, spaced apart from one another in a longitudinal direction of the endless track, and extending transversally to the longitudinal direction of the endless track.

11. The endless track claimed in claim 10, wherein the layer of reinforcing fabric is located between the ground-engaging outer side and the cross bars.

12. The endless track claimed in claim 10, wherein the layer of reinforcing fabric is located between the inner side and the cross bars.

13. The endless track claimed in claim 10, comprising a layer of cords embedded within the rubber-based body, the cords extending generally parallel to one another and in the longitudinal direction of the endless track.

14. The endless track claimed in claim 13, wherein the cross bars are located between the layer of cords and the ground-engaging outer side.

15. The endless track claimed in claim 13, wherein the layer of reinforcing fabric is located between the layer of cords and the cross bars.

16. The endless track claimed in claim 10, wherein each of the cross bars comprises composite material.

17. The endless track claimed in claim 1, wherein the layer of reinforcing fabric comprises reinforcing woven fabric.

18. The endless track claimed in claim 17, wherein the reinforcing woven fabric comprises woven manmade fibers.

19. The endless track claimed in claim 1, wherein, when operated at a given speed, the endless track consumes less power than if the endless track had an additional layer of reinforcing fabric embedded within the rubber-based body and spaced apart from the layer of reinforcing fabric.

20. The endless track claimed in claim 19, wherein the given speed is above 60 miles per hour.

21. The endless track claimed in claim 1, wherein respective ones of the rubber-based traction projections are spaced apart from one another in a longitudinal direction of the endless track.

22. The endless track claimed in claim 21, wherein certain ones of the rubber-based traction projections are spaced apart from one another in a widthwise direction of the endless track.

23. The endless track claimed in claim 1, wherein a particular one of the rubber-based traction projections comprises a first part having a first height and a second part having a second height different from the first height.

24. A snowmobile or ATV comprising the endless track claimed in claim 1.

25. An endless track for traction of a snowmobile or all-terrain vehicle (ATV), the endless track comprising:
   a) a rubber-based body having:
      an inner side for facing a drive wheel of the snowmobile or ATV; and
      a ground-engaging outer side for engaging the ground on which the snowmobile or ATV travels;
   b) a plurality of rubber-based traction projections projecting outwardly from the ground-engaging outer side; and
   c) a layer of reinforcing fabric embedded within the rubber-based body;
   wherein the endless track does not comprise two layers of reinforcing fabric embedded within the rubber-based body and spaced apart from one another.

26. An endless track for traction of a snowmobile or all-terrain vehicle (ATV), the endless track comprising:
   a) a rubber-based body having:
      an inner side for facing a drive wheel of the snowmobile or ATV; and
      a ground-engaging outer side for engaging the ground on which the snowmobile or ATV travels;

b) a plurality of rubber-based traction projections projecting outwardly from the ground-engaging outer side; and c) a layer of reinforcing fabric embedded within the rubber-based body;

wherein, when operated at a given speed, the endless track consumes less power than if the endless track had an additional layer of reinforcing fabric embedded within the rubber-based body and spaced apart from the layer of reinforcing fabric.

\* \* \* \* \*